Dec. 21, 1937.   L. C. DOANE   2,102,944
LIGHTING EQUIPMENT FOR PASSENGER VEHICLES
Filed March 25, 1936   2 Sheets-Sheet 1

INVENTOR
LEROY C. DOANE
BY
Jacob Luberman
ATTORNEY

Dec. 21, 1937.  L. C. DOANE  2,102,944
LIGHTING EQUIPMENT FOR PASSENGER VEHICLES
Filed March 25, 1936   2 Sheets-Sheet 2
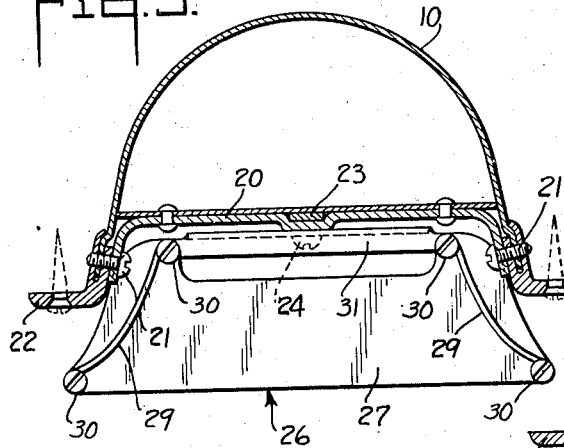
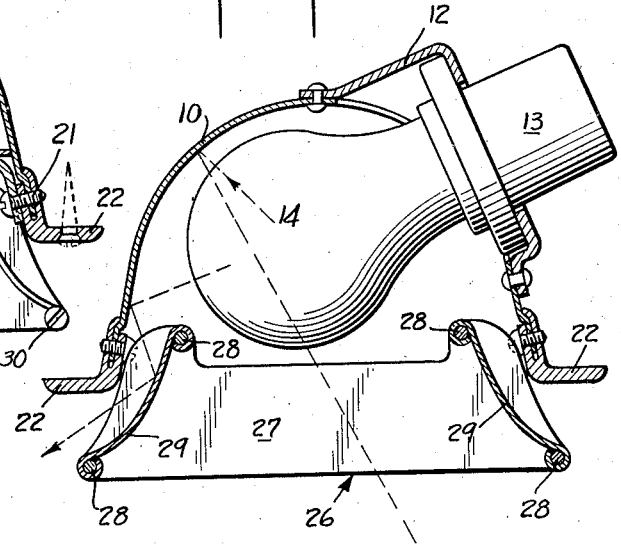
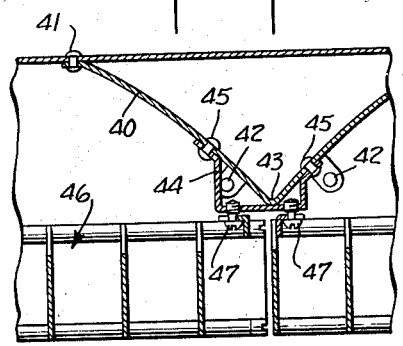
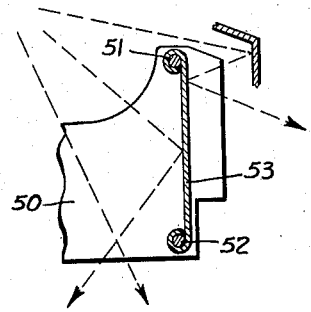
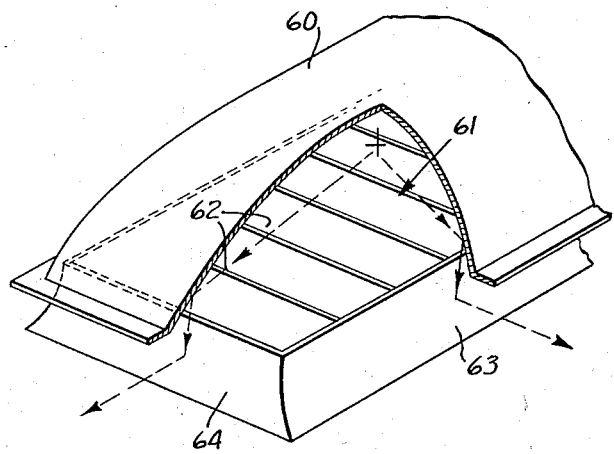
INVENTOR
LEROY C. DOANE
BY
ATTORNEY Patented Dec. 21, 1937

2,102,944

UNITED STATES PATENT OFFICE 2,102,944

LIGHTING EQUIPMENT FOR PASSENGER VEHICLES

Leroy C. Doane, Meriden, Conn., assignor to The Miller Company, Meriden, Conn., a corporation of Connecticut Application March 25, 1936, Serial No. 70,816

14 Claims. (Cl. 240—7.35)

The present invention relates to lighting equipment for passenger vehicles, and is more particularly directed toward lighting equipment adapted for use over the rows of seats provided along the sides of passenger cars and buses.

According to certain features of the invention, lighting equipment is contemplated wherein a plurality of regularly spaced light sources supported above each row of seats are associated with a long screen composed of a row of transversely disposed, regularly spaced louvers which screen the sources against observation by occupants of the seats underneath at ordinary angles of observation, and which allow the light to pass downwardly toward the seats to illuminate the reading plane, the screen having longitudinally extending light deflectors (along one or both sides) for elevating the light for ceiling illumination. Each light source is preferably surrounded by an open-mouthed reflector designed to direct the light through the screen with little interference. The screen is made up in separable units, one for each light source, and these units are preferably demountably secured so as to facilitate bulb renewal Where isolated sources are required, or the spacing of the sources is too great, each source is provided with a reflector and screen so that the light is controlled in essentially the same manner as in one element of a continuous unit. An isolated unit may have end deflectors to afford ceiling illumination longitudinally of the unit.

The equipment is so placed in the car or vehicle that the downwardly emitted light spreads sufficiently in transverse planes to light up the upper side walls of the car, together with the baggage rack or advertising cards and the entire width of the seats, as well as the aisle.

The present invention also contemplates the provision of a continuous lighting unit having a long inverted trough of sheet metal forming the principal structural part and adapted for mounting in a recess in the ceiling. This inverted trough is provided with spaced inserts which divide the trough into bulb-receiving chambers and effect light control. The trough may be reinforced along its edges by stiffening members which provide mounting flanges, and the trough may, if desired, be reinforced transversely.

The screens contemplated by the present invention are made up of a number of spaced parallel plates held together by longitudinally extending bolts provided with spacers. Some or all of these spacers may be arranged to provide longitudinally extending light deflectors.

Other and further objects will appear as the description proceeds.

The accompanying drawings show, for purposes of illustrating the present invention, several embodiments in which the invention may take form, it being understood that the drawings are illustrative of the invention rather than limiting the same.

Figure 3:
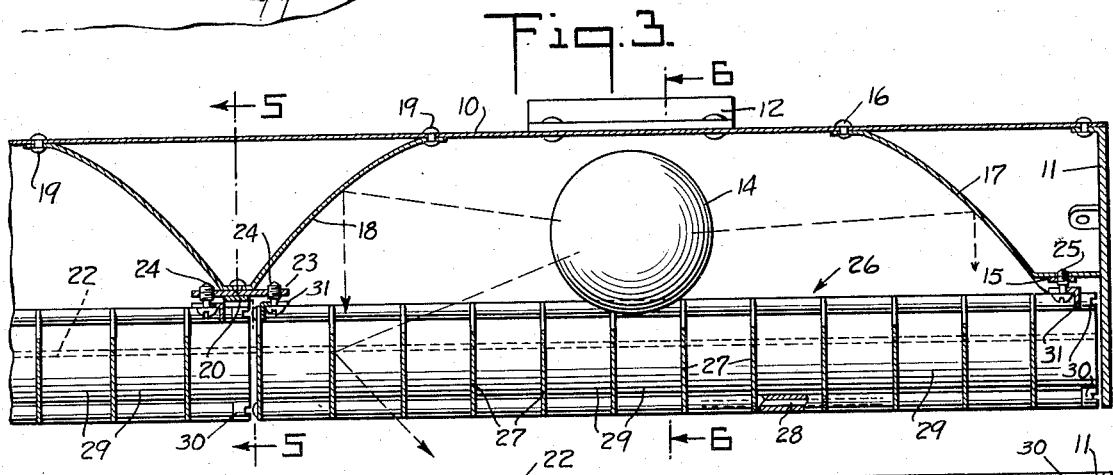
Fig. 3 is a larger scale longitudinal sectional view through the continuous lighting trough.
Figure 4:
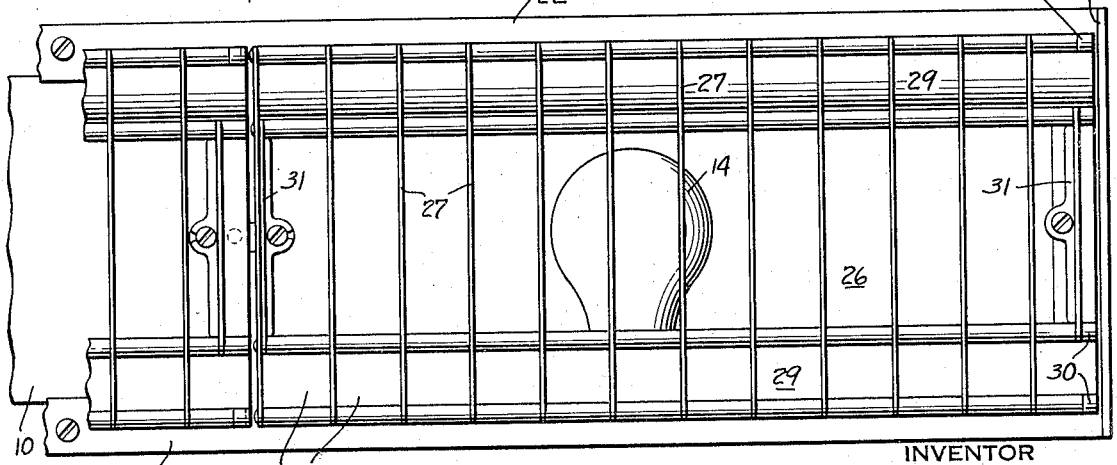
Fig. 4 is an inverted plan view of the continuous lighting trough.

Figs. 5 and 6 are transverse sectional views taken on the lines 5—5 and 6—6 of Fig. 3;

Fig. 7 is a fragmentary longitudinal view showing a modified form of construction;

Fig. 8 is a transverse sectional view showing a modified form of screen; and

Fig. 9 is a diagrammatic perspective view illustrating an isolated unit.

Figure 1:
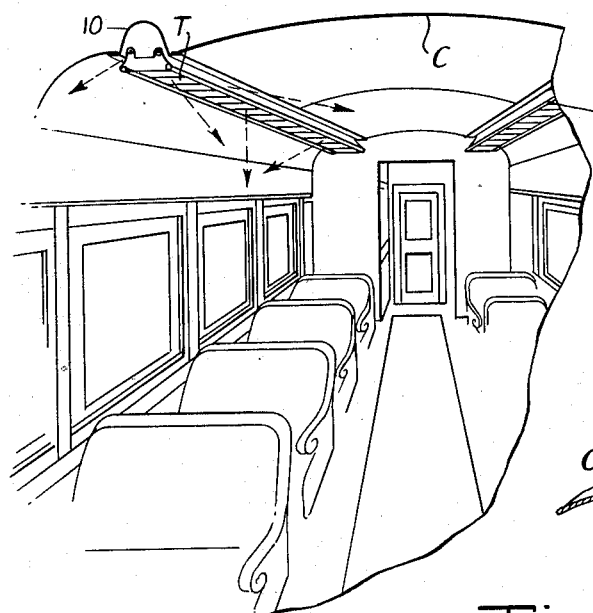
Fig. 1 is a perspective view of the interior of a passenger coach provided with a continuous lighting trough.

From Fig. 1 it will be apparent that a continuous lighting trough T is placed above each row of seats and is recessed into the ceiling of the car.

Figure 2:
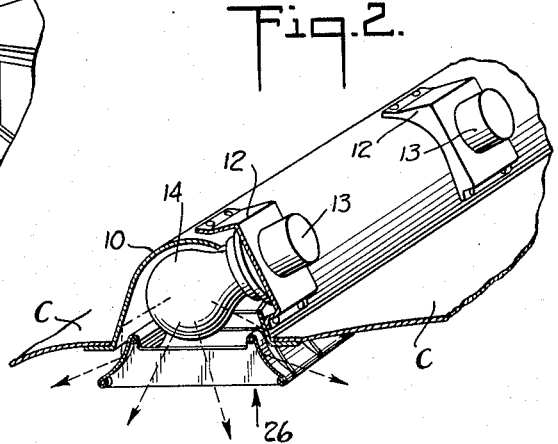
Fig. 2 is a slightly enlarged perspective view of the continuous lighting trough.

From Figs. 1 and 2 it will be apparent that the lower part of the unit projects slightly below the surface of the ceiling C.

Where the continuous lighting troughs are to be employed, they are made up in sections as long as can be conveniently handled. Each section has an inverted, trough-shaped sheet metal reflector member 10 secured to end members, as indicated at 11, and suitably fastened in place in the vehicle.

The reflector 10 is provided with a number of suitably spaced socket-supporting straps 12 adapted to support lamp sockets 13. Lamp bulbs 14 carried by these sockets project into the trough at regular intervals. Adjacent each of the extreme ends of the trough a cross-strap 15 is secured, and this cross-strap, together with a rivet indicated at 16, supports an insert 17 of sheet metal shaped somewhat as indicated so as to reflect light rays downwardly.

Intermediate the other lamp bulbs, the longitudinal trough is provided with V-shaped inserts 18. These are held in place by rivets indicated at 18, 19 and by a cross-strap indicated at 20. This cross-strap is secured by screws indicated at 21 to longitudinally extending reinforcing strips 22. These strips are preferably made of extruded aluminum and may be interlocked with the sheet metal reflector, as indicated in the drawings. These V-shaped inserts have oblique reflecting surfaces, as indicated in the drawings, and direct the light downwardly.

The cross-straps 20 are provided with short straps 23 tapped to receive screws indicated at 24, 24. The cross-straps 15 are tapped to receive screws indicated at 25. The latter-mentioned screws are employed to support a screen indicated generally at 26.

The screen 26 employs a number of vertically disposed aluminum plates 27 held together by four longitudinally extending rods 28. Between each pair of adjacent plates the rods carry spacer members indicated at 29. These spacer members are made of sheet metal and have upper and lower eyes through which the rods pass. The assemblage is held together by nuts 30 threaded onto the ends of the rods. The upper rods also carry bridging members 31 adjacent the ends of the screen. These bridging members are notched to receive screws 24 and 25 which fit the tapped holes in the straps 23 and 15.

The inserts on opposite sides of each lamp bulb provide that bulb with an open-mouthed reflector form of rectangular contour, and across the mouth of this reflector is placed the screen unit. In longitudinal planes the spread of direct light is controlled by the transverse plates, and the light source is screened against observation by the passengers. The reflected light is projected down through the plates, as will be apparent from the drawings.

The longitudinally extending members 29 which act as spacers also act as supplemental reflectors. They receive light reflected downwardly by the marginal portions of the trough and reflect this light outwardly at high angles. Owing to the diffusing nature of the reflecting surfaces employed, this light is scattered so as to illuminate the ceiling. These light-deflecting members and spacers also function as screens to limit the lateral spread of light. Where there is no need to build up ceiling illumination on one side of the lighting equipment, the longitudinally extending reflecting members 29 may be omitted and the transverse plates held in position by any suitable form of spacing means.

The screen which has been described is made up out of a plurality of identical stamped parts and may readily be made to a particular size; but, if conditions require, the length of the screen may be readily altered by trimming off the side edges of the spacers.

In the form of construction fragmentarily shown in Fig. 7, the V-shaped reflector 40 is held in place by rivets 41, 42. The bottom of the V-shaped member indicated at 43, extends across the trough and is spanned by a strap or saddle indicated at 44, this strap being secured in place by rivets 45.

The louver assembly 46 may be made up in the same way as has been described, and is held in place by screws 47.

In the arrangement diagrammatically shown in Fig. 8, the transverse plates 50 are held together by two rods 51 and 52 in the same vertical plane, and the spacers 53 are secured to these rods in the same way as previously indicated.

The arrangement shown in Fig. 9 is designed for isolated units. Here the reflector 60 is an open-mouthed reflector of rectangular contour. The screen 61 has cross-plates 62 analogous to cross-plates 27. The ends of these vertical plates are secured to longitudinally extending side plates 63 by welding, riveting or in any other convenient manner.

An end of the screen 61 is indicated at 64. This is in the form of an end plate obliquely disposed underneath the end of the reflector. With this arrangement, light from the source indicated at X and reflected by the longitudinal marginal portions of the reflector 60 is reflected in high angles by the longitudinally extending side plates 63, while light reflected downwardly by the end portions of the reflector 60 and intercepted by the end plates 64 of the screen is reflected into high angles longitudinally of the unit.

Certain of the features of construction herein shown are claimed in my co-pending application, Serial No. 70,817 filed concurrently herewith.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A lighting unit for passenger vehicles comprising a light source, a longitudinally extending, inverted reflector within the ceiling of the vehicle for reflecting light downwardly at controlled spread in transverse planes, and a screen below the reflector and light source and adapted to protrude below the vehicle ceiling, the screen comprising a plurality of vertically disposed, transversely extending, diffusing plates which screen the light source from direct observation at directions substantially angularly distant from the nadir, the inverted reflector having end portions which slope downwardly and outwardly for intercepting direct light and reflecting it downwardly at lowered angles, the screen plates condensing the direct and reflected light in longitudinal planes without affecting its distribution in transverse planes and being substantially evenly illuminated by the scattered reflected light from the end portions of the reflector, said screen having longitudinally extending side reflector members connected with said screen plates and having their upper edges extending into said inverted reflector and spaced from the side edges for intercepting a small portion of the reflected light and redirecting it into high angles for ceiling illumination.

2. In a passenger vehicle having a central aisle and rows of seats on opposite sides of the aisle, lighting equipment placed over each row of seats and extending lengthwise of the vehicle, the lighting equipment comprising spaced light sources, a downwardly opening reflecting trough about the light sources, a louver system below the sources and extending parallel to the reflector trough opening, said louver system comprising a plurality of transversely disposed diffusing plates which shield the light sources against observation by the occupants of the seats below and allow downwardly directed light to spread in transverse planes, and longitudinally extending light deflectors connected with the opposite ends of said diffusing plates and having their upper edges disposed within the reflector trough opening at opposite sides of the light sources for intercepting light reflected by the marginal portions of the reflecting trough and reflecting it at high angles for ceiling illumination.

3. A luminair comprising a light source, an inverted reflecting trough, and a normally horizontal screen closing the mouth of the trough and comprising a plurality of transverse, vertical, spaced oqaque plates which limit the divergence of emitted light in longitudinal planes and screen the source against observation in longitudinal planes, and longitudinally extending downwardly and outwardly sloping side reflector members connected with the opposite ends of said plates and extending partly within and partly outside the mouth of the trough for screening the light source against observation in regions beyond a predetermined angle in transverse planes from the nadir and for reflecting a portion of the light reflected from opposed surfaces of the reflecting trough into high angles of illumination for illuminating the ceiling laterally of the trough.

4. A luminair as claimed in claim 3, wherein the transverse plates extend beyond the side members and the side members act as spacers to separate the plates.

5. A luminair as claimed in claim 3, wherein the transverse plates extend beyond the side members and the side members act as spacers to separate the plates, the spacers being carried by longitudinally extending rods which pass through the transverse plates.

6. A luminair as claimed in claim 3, wherein the side members are substantially continuous and the transverse members are secured at their ends to the side members.

7. A luminair comprising a light source, an inverted reflecting trough, a normally horizontal screen closing the mouth of the trough and comprising a plurality of transverse, vertical, spaced, opaque plates which limit the divergence of emitted light in longitudinal planes and screen the source against observation in longitudinal planes, and longitudinally extending downwardly and outwardly sloping side reflector members mounted between the plates adjacent the opposite ends thereof for screening the light source against observation in regions beyond a predetermined angle in transverse planes from nadir, said side members extending partly into the trough for reflecting a portion of the reflected light into high angles for ceiling illuminatiion laterally of the reflecting trough, and means for detachably supporting the screen from the reflecting trough so that it can be removed downwardly for lamp bulb renewal.

8. A luminair comprising a light source, an inverted reflecting trough, a normally horizontal screen closing the mouth of the trough and comprising a plurality of transverse, vertical, spaced, opaque plates which limit the divergence of emitted light in longitudinal planes and screen the source against observation in longitudinal planes, and longitudinally extending tie rods and spacers securing the plates in spaced relationship, and bridging members secured to the rods near the ends of the screen and detachably supported from the reflecting trough.

9. Lighting equipment comprising an elongated reflecting trough, a plurality of spaced light sources disposed in the trough, inserts in the trough on opposite sides of each light source, each insert presenting a transversely disposed reflecting surface toward the adjacent light source for limiting the divergence in longitudinal planes of rays reflected thereby, whereby each light source is provided with a rectangular open-mouthed reflector form, and a plurality of individually mounted screen sections, one across the mouth of each reflector form, each screen section having a plurality of spaced, vertical and transversely extending plates for limiting the divergence of directly emitted and reflected light in longitudinal planes and screening the source against observation in longitudinal planes, the opposite ends of lower portions of said plates extending beyond adjacent sides of the reflecting trough.

10. Lighting equipment as claimed in claim 9, wherein the inserts are in the form of V-shaped sheet metal stampings secured to the trough angularly disposed relatively to a respective light source.

11. Lighting equipment comprising an elongated reflecting trough, a plurality of spaced light sources disposed in the trough, inserts in the trough on opposite sides of each light source, each insert presenting a transversely disposed reflecting surface toward the adjacent light source for limiting the divergence in longitudinal planes of rays reflected thereby, whereby each light source is provided with a rectangular open-mouthed reflector form, and a plurality of individually mounted screens, one across the mouth of each reflector form, each screen having transversely extending plates for limiting the divergence of emitted light in longitudinal planes and screening the source against observation in longitudinal planes, and longitudinally extending side reflector members disposed between said plates adjacent their ends and spaced closer to the light sources than the side edges of the reflector mouth for intercepting a small portion of the light from the said side edges and redirecting it into high angles for ceiling illumination.

12. Lighting equipment comprising an elongated reflecting trough, a plurality of spaced light sources disposed in the trough, cross members intermediate the sources for reinforcing the trough, and a screen extending over the opening of the trough opposite each source and detachably secured to and outwardly of the adjacent cross members, each screen having transversely extending plates for limiting the divergence of emitted light in longitudinal planes and screening the source against observation in longitudinal planes.

13. Lighting equipment as claimed in claim 12, having divergent light deflectors extending from the intermediate cross members to the rear of the trough.

14. Lighting equipment as claimed in claim 12, wherein the reflecting trough carries longitudinally extending marginal stiffening members.

LEROY C. DOANE.